US012118350B1

(12) United States Patent
Mukherjee et al.

(10) Patent No.: US 12,118,350 B1
(45) Date of Patent: Oct. 15, 2024

(54) HIERARCHICAL CLUSTERING FOR CODING PRACTICE DISCOVERY

(71) Applicant: Amazon Technologies, Inc., Seattle, WA (US)

(72) Inventors: Rajdeep Mukherjee, San Jose, CA (US); Hoan Anh Nguyen, Bothell, WA (US); Pranav Garg, Secaucus, NJ (US); Omer Tripp, San Jose, CA (US); Sengamedu Hanumantha Rao Srinivasan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 178 days.

(21) Appl. No.: 17/491,088

(22) Filed: Sep. 30, 2021

(51) Int. Cl.
*G06F 8/71* (2018.01)
*G06F 8/20* (2018.01)
*G06F 16/901* (2019.01)

(52) U.S. Cl.
CPC ............... *G06F 8/71* (2013.01); *G06F 8/20* (2013.01); *G06F 16/9024* (2019.01)

(58) Field of Classification Search
CPC ........... G06F 8/71; G06F 8/20; G06F 16/9024
See application file for complete search history.

(56) References Cited

U.S. PATENT DOCUMENTS

| | | | | |
|---|---|---|---|---|
| 8,356,278 B2 * | 1/2013 | Drissi | .................. | G06F 8/36 717/102 |
| 8,595,690 B2 * | 11/2013 | Moore | .................. | G06F 8/35 717/106 |
| 8,990,883 B2 * | 3/2015 | Kapoor | .................. | H04L 63/20 726/1 |
| 9,037,552 B2 | 5/2015 | Rajaram | | |
| 9,430,359 B1 * | 8/2016 | Troutman | ........... | G06F 11/0793 |
| 9,619,779 B2 * | 4/2017 | Fosback | .................. | G06Q 10/10 |
| 9,684,649 B2 | 6/2017 | Shen et al. | | |
| 9,882,824 B2 * | 1/2018 | Maes | .................. | H04L 47/70 |
| 10,009,228 B2 * | 6/2018 | Elias | .................. | H04L 41/0873 |
| 10,534,604 B1 | 1/2020 | Kimball et al. | | |
| 10,579,360 B2 * | 3/2020 | VanBlon | .................. | G06F 8/65 |
| 11,150,897 B1 * | 10/2021 | Sawant | .................. | G06F 8/75 |
| 11,188,515 B2 * | 11/2021 | Kurian | .................. | G06F 16/2365 |
| 11,604,626 B1 * | 3/2023 | Sawant | .................. | G06F 8/75 |
| 2006/0064486 A1 * | 3/2006 | Baron | .................. | H04L 41/0886 709/224 |
| 2011/0283270 A1 * | 11/2011 | Gass | .................. | G06F 8/65 717/168 |
| 2012/0017195 A1 * | 1/2012 | Kaulgud | .................. | G06F 11/3692 717/101 |
| 2015/0227505 A1 | 8/2015 | Morimoto | | |
| 2016/0103754 A1 | 4/2016 | Aggarwal et al. | | |
| 2016/0216964 A1 * | 7/2016 | Balasubramanian | ..... | G06F 8/77 |
| 2018/0032499 A1 * | 2/2018 | Hampson | .................. | G06F 40/232 |

(Continued)

*Primary Examiner* — Douglas M Slachta
(74) *Attorney, Agent, or Firm* — S. Scott Foster; Kowert, Hood, Munyon, Rankin & Goetzel, P.C.

(57) ABSTRACT

Code changes may be hierarchically clustered to discover coding practices. Code change graphs for changes to code in a source code repository may be clustered according to hierarchy of different features determined for the source code into groups. The code change graphs in the groups may then be indexed according their similarity with other code change graphs in the groups. Then one or more coding practices corresponding to the indexed code changes may be provided.

20 Claims, 10 Drawing Sheets

(56) References Cited

U.S. PATENT DOCUMENTS

| | | | |
|---|---|---|---|
| 2018/0101465 A1* | 4/2018 | Keinan | G06F 11/3604 |
| 2019/0238708 A1* | 8/2019 | Kozlovsky | G06F 16/93 |
| 2019/0243621 A1* | 8/2019 | Gass | G06F 8/425 |
| 2020/0097387 A1* | 3/2020 | Loyola | G06F 11/3692 |
| 2020/0201608 A1* | 6/2020 | Wallbaum | G06F 8/35 |
| 2020/0379879 A1* | 12/2020 | Plotnik | G06F 21/577 |
| 2021/0263728 A1* | 8/2021 | Farrier | G06Q 10/0635 |
| 2022/0214872 A1* | 7/2022 | Kay | G06F 8/71 |
| 2022/0276860 A1* | 9/2022 | Balasubramanian | G06F 8/70 |

* cited by examiner interactive practice generation interface 500 coding practice prompt 510

*Before change 520*

```
putRecordsRequest.setRecords(putRecordsRequestEntryList);
service.putRecords(putRecordsRequest);
```

*After change 530*

```
PutRecordsResult putRecordsResult =
serviceClient.putRecords(putRecordsRequest);

if (putRecordsResult.getFailedRecordCount() > 0) {
    LOGGER.warn("[DISTRIBUTION] Failed to distribute
                 some tasks to Service Stream.");
}
```

*practice confirmation and description 540*

Does this example illustrate a coding practice that should be checked?

*response 542*

Please provide other information for detecting and correcting code using this practice

*response 544*

HIERARCHICAL CLUSTERING FOR CODING PRACTICE DISCOVERY

BACKGROUND

Programming languages offer developers, designers, and other users with the ability to precisely specify the operation of various hardware or software designs for many different applications. Given the wide variety of programming languages, these developers, designers, and other users may encounter or otherwise use code written in a programming language which may be less familiar to the developer. Code development tools offer developers, designers, and other users with different capabilities to improve code performance and identify errors, which may in the exemplary scenario described above, help to overcome a developer's lack of familiarity with a programming language (or an environment in which the programming language is deployed) so that high performing code may still be written.

BRIEF DESCRIPTION OF THE DRAWINGS

FIG. 5 is a logical block diagram illustrating an interactive practice generation interface, according to some embodiments.

Figure 1:
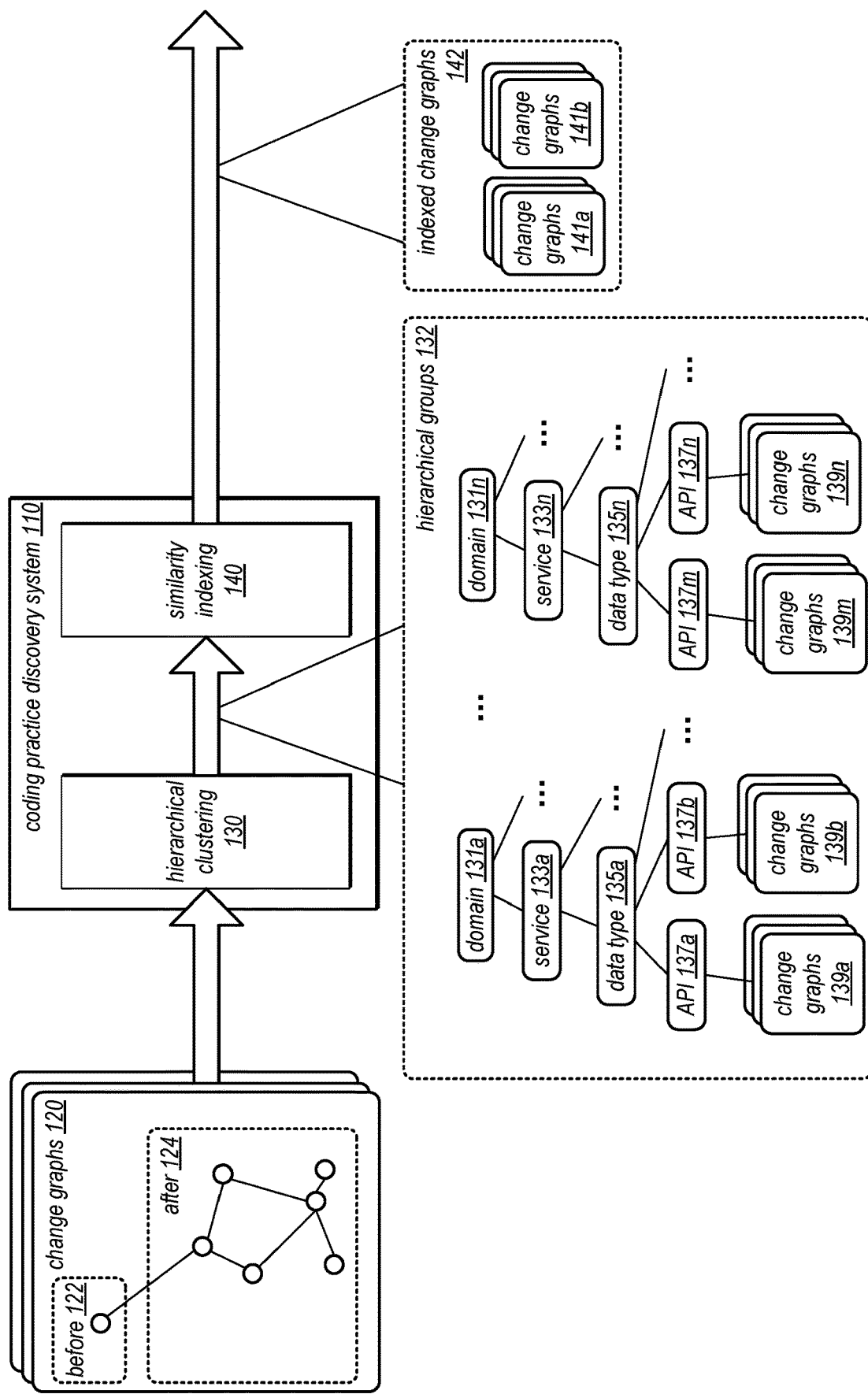
FIG. 1 is a logical block diagram illustrating hierarchical clustering for coding practice discovery, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various techniques for hierarchical clustering for coding practice discovery are described herein. In various embodiments, coding practices may be rules, guidance, exemplary forms, or other descriptions of coding various features in source code that may be used to develop high quality systems, services, or applications. These practices may be used to detect a wide range of sub-optimal code, including code errors (e.g., bugs), API misuse, concurrency issues, performance issues, and several other static analysis errors.

Code changes, which describe various updates committed to the source code executed to implement various software and/or hardware systems, applications, or devices, may contain rich information about changes to produce more efficient, more performant, and less erroneous code (e.g., by applying bug fixes and correcting common mistakes). This information can be leveraged to derive coding practices which, if implemented in existing and source code written in the future, can improve the performance of various systems, services, or applications. Given the scale of some code repositories for different products, services, or domains, identifying coding practices can be difficult, particularly when the number of programming languages, services, frameworks, or other domains in which source code is written may create more new coding practices than any one entity may be able to reliably track. Thus, hierarchical clustering for coding practice discovery to efficiently discover those coding practices that may be relevant to a particular scenario, as may be identified by the hierarchy used to identify the coding practices.

For example, learning from recurring "bug fix" code changes in a software application's change history where the "after" snapshot is the fixed code and the "before" snapshot is the buggy code, that are committed by multiple developers and that occurs in different software repositories, may lead to coding practices that have high value and high acceptance. Automating the process of mining and indexing these code changes may enable, in various embodiments, automatic sourcing and generation of coding practices. Such techniques may yield a higher coverage of coding practices since code changes extracted from the "wild" may use a wide variety of open-source libraries from various domains. Using hierarchical clustering to discover code changes may allow for code changes to be indexed on similarity, which can then be used in various downstream application scenarios, such as automatic synthesis of coding practices, generating recommendations from code examples, and many others.

Figure 4:
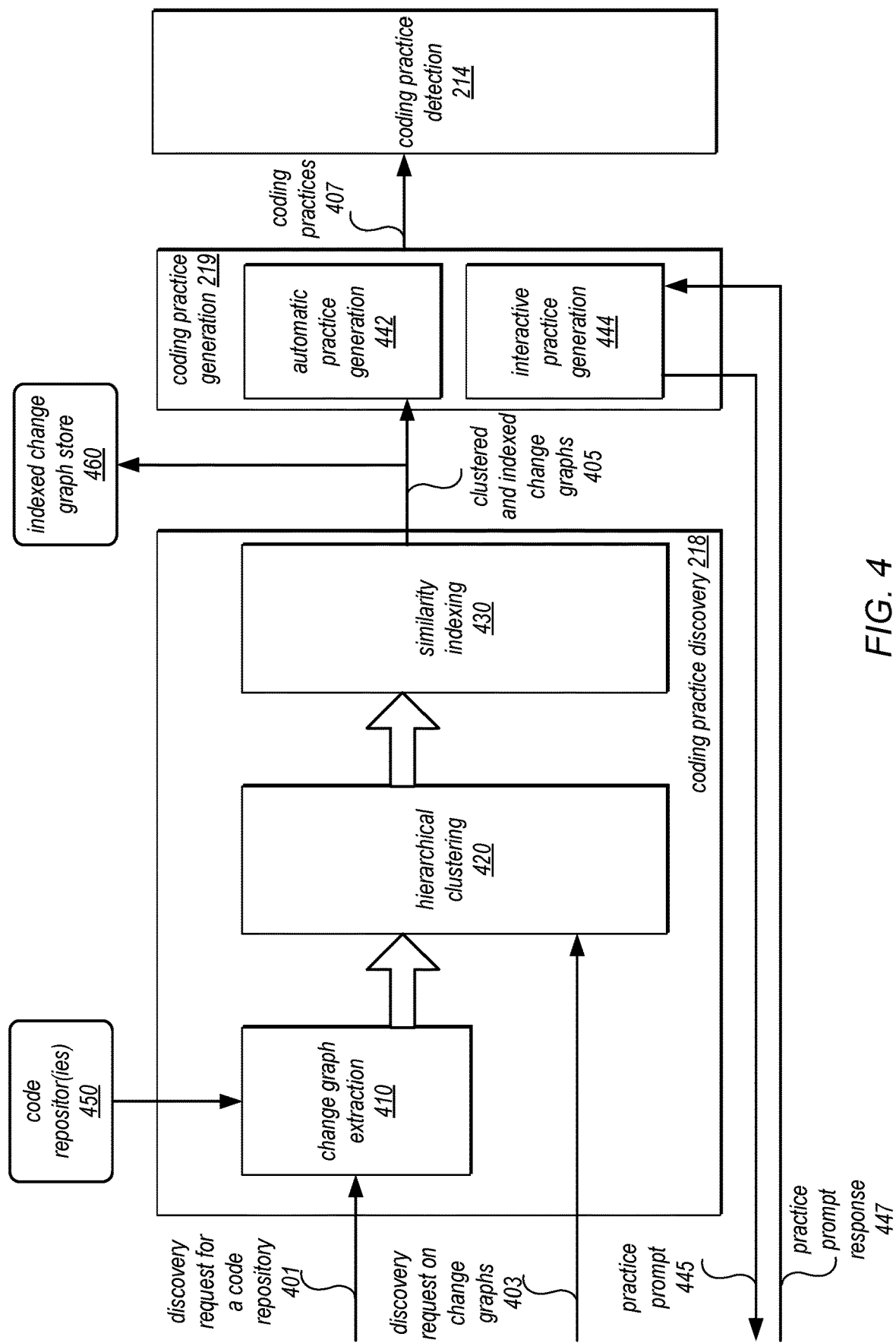
FIG. 4 is a logical block diagram illustrating coding practice discovery and coding practice generation, according to some embodiments.

FIG. 1 is a logical block diagram illustrating hierarchical clustering for coding practice discovery, according to some embodiments. Coding practice discovery system 110 may be a stand-alone system, application, service, or tool, or may be integrated as part of a larger application, system, or service (e.g., practice discovery feature 218 implemented as part coding practice management 216 in code development service 210 I in FIG. 2). Coding practice discovery system 110 may implement hierarchical clustering 130 and similarity indexing 140. In some embodiments, coding practice discovery may also implement code change graph generation or extraction, as illustrated in FIG. 4.

Coding practice discovery system 110 may receive or obtain change graphs 120. Change graphs 120 may describe and correspond to a portion of code from a source code repository that includes before 122 and after 124 after code change. Change graphs 120 may include various nodes to describe data, control and actions in the code portions. The edges in change graphs 120 could also indicate various information, such as a map or other link of before 122 and after 124, as well as various indications of the data and/or features of different relationships between nodes (e.g., control, parameter, or definition).

Hierarchical clustering 130 may extract or determine features of the corresponding code portions of change graphs 120 (e.g., from change graphs directly and/or from the large code files, objects, and/or repositories from which the code portions are from). These features may describe varying levels or degrees of shared commonality of code portions in a common location in a hierarchical group. These features may be used to create a hierarchy of code changes. For example, as illustrated in FIG. 1, in a hierarchy of domain 131a, service 133a, data type 135a, and APIs 137a and 137b, where domain is a top-level category and may include cloud providers (such as provider network 200 in FIG. 2), programming languages, or other frameworks for code. Service features may be an underlying category such as a type of service in a cloud provider or a category of features of a programming language (e.g., in a package), data types may be various types of data handled in the service or types of actions within the category of features, and APIs may include various functions, invocation, methods, etc. Note that other hierarchies may be used than the examples illustrated in FIGS. Different hierarchies using the same features, such as a hierarchy of a different domain 131n, service 133n, data type 135n, and APIs 137m and 137n.

At the lowest level of hierarchies you may find the groups of change graphs, such as groups 139a, 139b, 139m and 139n that were clustered into the hierarchical groups 132 according to a hierarchy. Change graphs may belong to more than one hierarchy (e.g., to a cloud provider hierarchy and a programming language hierarchy). Similarity indexing 140 may then be performed on the hierarchical groups at the lowest level (e.g., making groups within the leaf-level clusters/groups of a hierarchy). For example, as discussed in detail below with regard to FIGS. 4-9, the change graphs may be sliced to prune portions of change graphs that should not be considered for similarity, assign weights to nodes in the change graphs, and determine similarities between various change graphs to index together those change graphs that are determined to be similar (e.g., change graphs with similarity scores within a same similarity value range).

These indexed change graphs 142 may group different change graphs within a common location (e.g., change graphs 139a may be divided into one (or more change graphs that are indexed together), such as change graphs 141a and 141b. In this way, change graphs 141a can provide an example of one coding practice indicated by the similarity of changes described in those change graphs and similarly change graphs 141b may describe another coding practice indicated by the similarity of changes described in those change graphs. Indexed change graphs 142 may then be used for detecting, generating, and/or providing coding practices. For example, as discussed below with regard to FIG. 3, a search or request for change graphs indexed together according to the same features (e.g., one or more coding practices for API 137m) may be returned. Because the change graphs are clustered into groups according to their hierarchical location, the work to perform similarity analysis can be substantially reduced. Moreover, when examples of or detection for specific types of coding practices are desired, the hierarchy can be used to easily locate specific types of coding practices (e.g., by requesting coding practices from a particular location in a domain/service/data type/API).

Please note that previous descriptions are not intended to be limiting, but are merely provided as an example of a coding practice discovery system. Various other embodiments may also implement these techniques, as discussed in detail below.

The specification next includes a general description of a provider network, which may implement a code development service that implements hierarchical clustering for coding practice discovery. Then various examples of a code development service are discussed, including different components/modules, or arrangements of components/module that may be employed as part of implementing a provider network. A number of different methods and techniques to implement hierarchical clustering for coding practice discovery are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
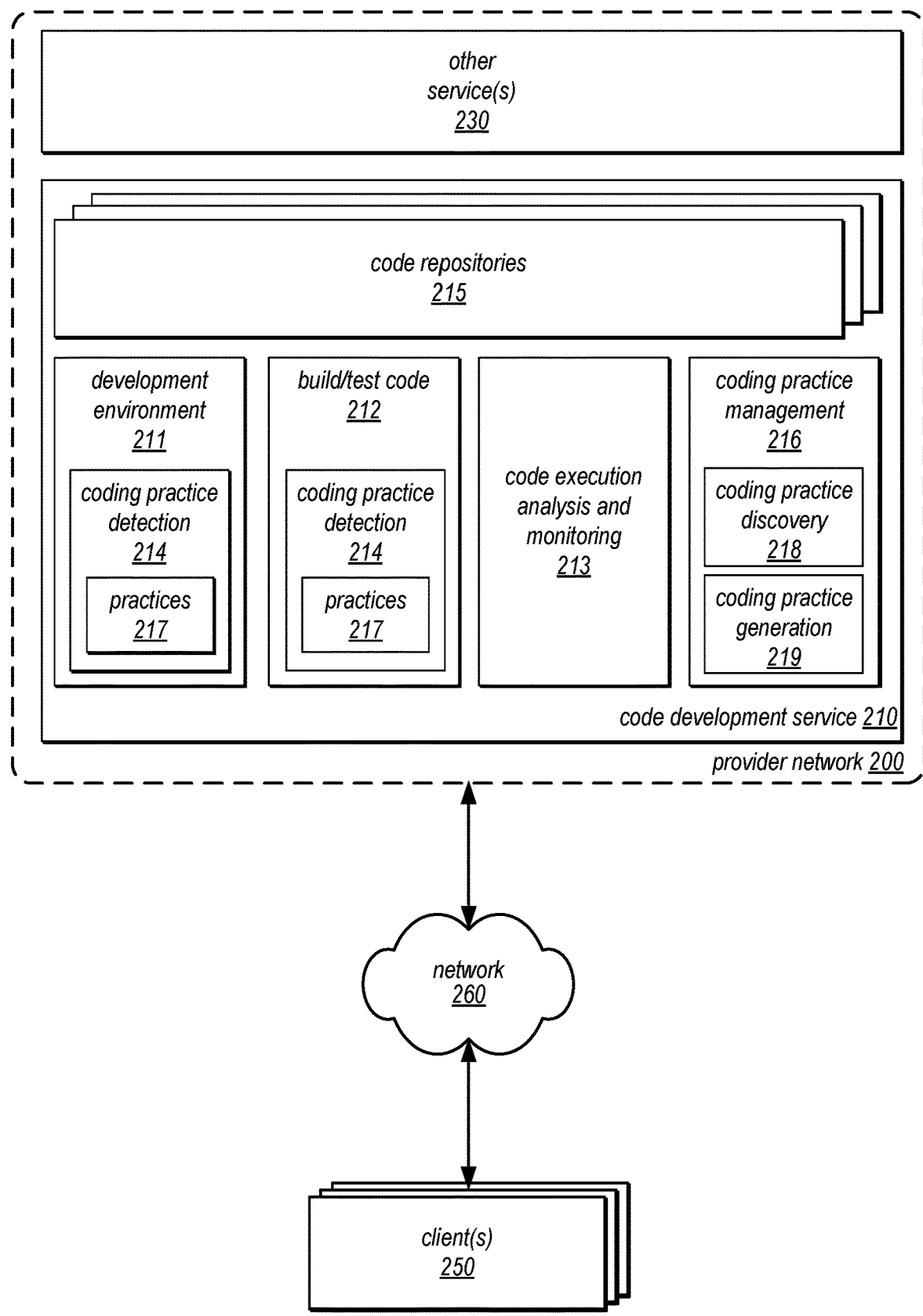
FIG. 2 is a logical block diagram illustrating a provider network that implements different services including a code development service that implements coding practice detection and discovery, according to some embodiments.

FIG. 2 is a logical block diagram illustrating a provider network that implements different services including a code development service that implements coding practice detection and discovery, according to some embodiments. A provider network 200 (which may, in some implementations, be referred to as a "cloud provider network" or simply as a "cloud") refers to a pool of network-accessible computing resources (such as compute, storage, and networking resources, applications, and services), which may be virtualized or bare-metal. The provider network 200 can provide convenient, on-demand network access to a shared pool of configurable computing resources that can be programmatically provisioned and released in response to customer commands. These resources can be dynamically provisioned and reconfigured to adjust to variable load.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. This compartmentalization and geographic distribution of computing hardware enables the provider network 200 to provide low-latency resource access to customers on a global scale with a high degree of fault tolerance and stability.

As noted above, provider network 210 may implement various computing resources or services, such as code development service 210, and other service(s) 230 which may be any other type of network based services, including various other types of storage (e.g., database service or an object storage service), compute, data processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of code development service 210) may be implemented by a particular node or may be distributed across several nodes. In some embodiments, a given node may implement the functionality of more than one service system component (e.g., more than one data store component).

Code development service 210 may be implemented by provider network 200, in some embodiments. Code development service 210 may implement various features for writing code for different systems, applications, or devices, providing features to recommend, identify, review, build, and deploy code. For example, code development service may implement development environment 211. Code development environment 211 may offer various code entry tools (e.g., text, diagram/graphics based application development) to specify, invoke, or otherwise write (or cause to be written) code for different hardware or software applications. Coding practice detection 214 may be implemented as part of development environment 211, in some embodiments.

Code development service 210 may implement build/test code features 212, in various embodiments. Build/test code 212 may, for example, compile and execute code to test for performance problems, bottlenecks, anomalies, cost or expense (e.g., in terms of execution time and/or resource utilization), among other characteristics of code. In some embodiments, coding practice detection 214 may be implemented as part of build/test code 212. For example, a run-time, executable or other version of code may be evaluated using techniques to detect the existence of best practices as part of build/test.

Code development service 210 may, in some embodiments, implement features to analyze and monitor deployed/executing code, as indicated at 213. For example, code execution analysis and monitoring 213 may monitor for performance anomalies and execution costs for portions of code after the code is deployed as part of a system or other application.

Code development service 210 may implement (or have access to) code repositories 215. Code repositories 215 may store various code files, objects, or other code that may be interacted with by various other features of code development service 210 (e.g., development environment 211 or build/test code 212). For example, coding practice detection 214 may provide detection for code repositories associated with an account and/or specified in a request for coding practice detection in some embodiments. Similarly code repositories 250 may searched or evaluated for coding practices, according to the various techniques discussed below with regard to FIGS. 3-9. Code repositories 215 may implement various version and/or other access controls to track and/or maintain consistent versions of collections of code for various development projects, in some embodiments. In some embodiments, code repositories may be stored or implemented external to provider network 200 (e.g., hosted in private networks or other locations).

Code development service 210 may implement an interface to access and/or utilize various features of code development service 210. Such an interface may include various types of interfaces, such as a command line interface, graphical user interface, and/or programmatic interface (e.g., Application Programming Interfaces (APIs)) in order to perform requested operations. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

Generally speaking, clients 250 may encompass any type of client configurable to submit network-based requests to provider network 200 via network 260, including requests for services (e.g., a request for practice discovery, etc.). For example, a given client 250 may include a suitable version of a web browser, or may include a plug-in module or other type of code module that may execute as an extension to or within an execution environment provided by a web browser. Alternatively, a client 250 may encompass an application (or user interface thereof), a media application, an office application or any other application that may make use of resources in provider network 200 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on a data storage service (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In some embodiments, provider network 200 may include the hardware (e.g., modems, routers, switches, load balancers, proxy servers, etc.) and software (e.g., protocol stacks, accounting software, firewall/security software, etc.) necessary to establish a networking links between different components of provider network 200, such as virtualization hosts, control plane components as well as external networks 260 (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 250 may be attached to the overlay network so that when a client 250 provides an IP address that they want to send packets to, the IP address is run in virtual space by communicating with a mapping service that knows where the IP overlay addresses are.

Figure 3:
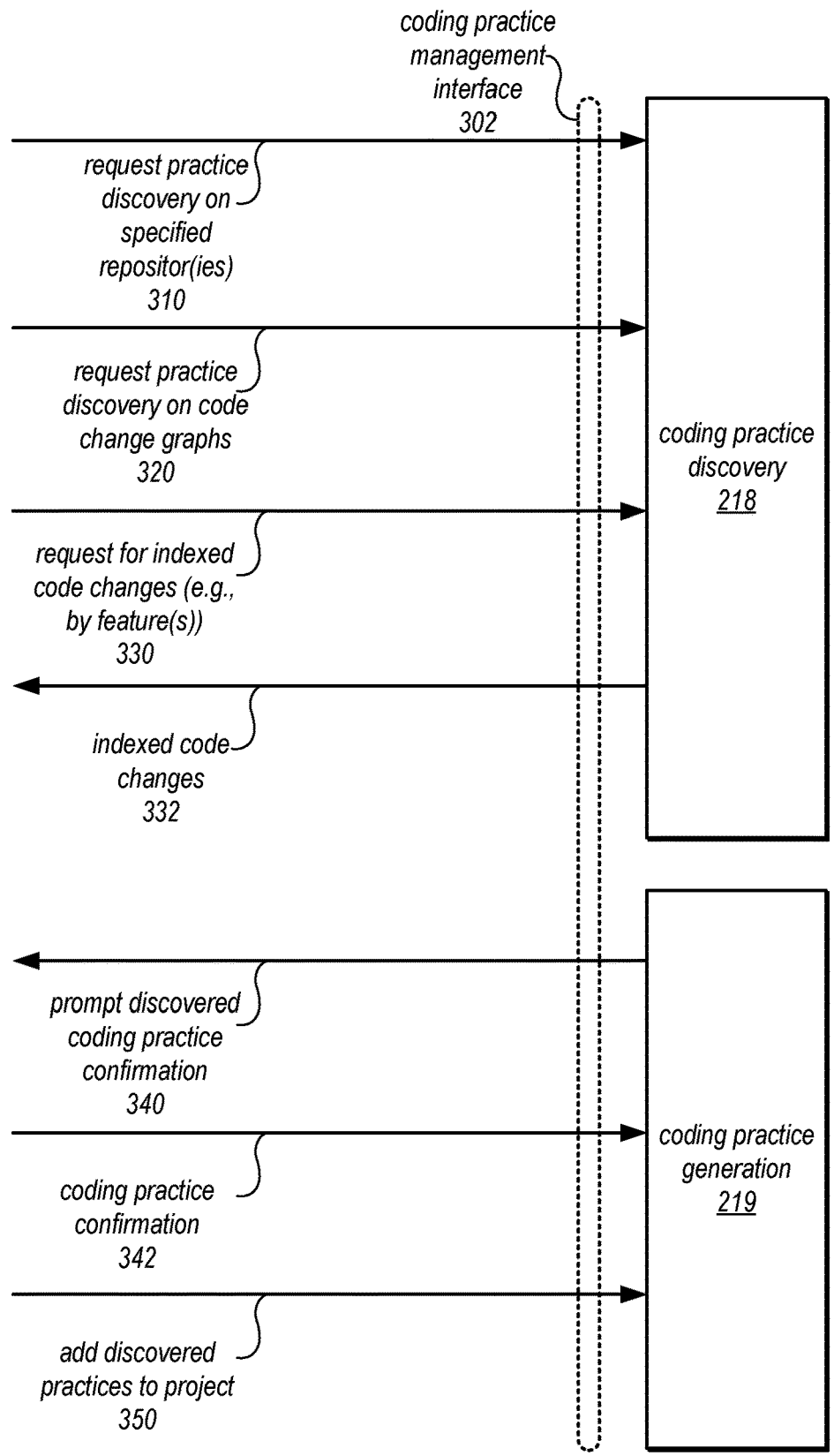
FIG. 3 is a logical block diagram illustrating an interface for coding practice management, according to some embodiments.

Coding practice management 216 may implement both a coding practice discovery 218 feature, similar to the techniques discussed above with regard to FIG. 1 and in more detail below with regard to FIGS. 4-9, and coding practice generation 219. An interface to utilize these features may be implemented, in some embodiments, such as part of a larger interface of coding development service 210 (e.g., graphically as part of a web-console, programmatic interface using APIs, and/or command line interface). FIG. 3 is a logical block diagram illustrating an interface for coding practice management, according to some embodiments.

Coding practice management interface 302 may support a request for practice discovery on specified repositor(ies), as indicated at 310. For example, the request 310 may support including identifiers of specific code repository(ies) (or portions thereof, such as a fork, branch, or other sub-set of code). Then, coding practice discovery 218 may extract change graphs and perform practice discovery, as discussed below with regard to FIG. 4. In this way, custom, user-specific, account-specific, organization-specific, other entity-specific coding practices can be discovered (which may or may not be applicable to other entities).

As indicated at 320, a request to perform practice discovery on identified code change graphs may be supported, in some embodiments. For example, a file, location, or other path to code change graphs to perform coding practice discovery may be supported in order to allow coding practice discovery to be performed without submitting an entire code repository for review (e.g., allowing users who do not wish to share the underlying source code to still have the ability to have practice discovery performed). Coding practice discovery 218 may then perform discovery techniques, as discussed below with regard to FIG. 4.

As indicated at 330, a request for indexed code changes may be supported by interface 302. For example, a request for indexed code changes that corresponds to one (or more) features that specify a level and/or location in a hierarchy (e.g., to request indexed code changes for an API applied to a service in a particular domain). Coding practice discovery 218 may store discovered practices and then handle requests like request 330 by searching for the index code changes and returning a response of indexed code changes 332 that satisfies the request 330.

As indicated at 340, coding practice generation 219 may implement an interactive practice generation feature, as discussed in detail below with regard to FIGS. 4 and 5. For example, the prompt 340 may provide a potential coding practice as may be exemplified by a before and after display of code. A coding practice confirmation 342 may, therefore, also be supported in order to allow for users to label and/or otherwise help to confirm potential coding practices or enhance the description or information associated with coding practices (which may be applicable for coding detection 214), in some embodiments.

As indicated at 350, a request to add discovered practices to a project may be received, in some embodiments. For example, as discussed above with regard to request 310, custom, user-specific, account-specific, organization-specific, other entity-specific coding practices may be discovered and can then be applied by a request 350. Although not illustrated, a similar request to exclude or remove discovered practices may be supported, in some embodiments.

FIG. 4 is a logical block diagram illustrating coding practice discovery and coding practice generation, according to some embodiments. Coding practice discovery 218 may perform the various techniques discussed above with regard to FIG. 1 and below with regard to FIGS. 6-9, to perform coding practice discovery, in some embodiments. For example, coding practice discovery 218 may be able to generate change graphs from code repository(ies) 450 (e.g., Github, CRUX, etc.) at change graph extraction 410. Code repositories 450 may be internally hosted code repositories (e.g., code repositories 250 in FIG. 2) and/or external code repositories (e.g., publicly available code repositories). In some embodiments, these code repositories 450 may have permission controls or other features that allow users to explicitly permit or otherwise allow use for coding practice discovery.

Change graph extraction 410 may generate change graphs, in some embodiments. For example, code changes (which may be detected responsive to commit, save, or other store requests that change portions of code). A difference tool, for example, may be used to compare versions of code before and after a commit (or similar operation). The differences in the code identified by the difference tool may be represented as graph structures, which as discussed above may change graphs. A change graph may include two-subgraphs, which has the form {before, after}, where before and after are the partial programs before and after the change, respectively. A change graph may contain data nodes, control nodes to represent the control-flow, and action nodes to represent function, method, or other action calls. The edges in change graph can be of following types: map (linking before and after) and control, parameter, and definition. The latter set of edge types may capture program semantics and map captures changes between before and after code. A map edge may be used to designate the mapped nodes between the before and after code. The source and destination of the mapped edges may be the same node (e.g., same action node), implying that the corresponding nodes have not changed, or different nodes, implying that the node in before code has changed to the mapped node in the after code, in some embodiments.

Code practice discovery 218 may perform hierarchical clustering 420 on code change graphs, either provided by change graph extraction 410 or identified/provided by discovery request on change graphs 403 (e.g., as part of the request or in a specified location that hierarchical clustering 420 can access (not illustrated)). For example, as discussed above (and below with regard to FIG. 6), different features of the code portions described by code change graphs may be determined for the code portions. For example, various headers, code comments, or other information may be used to identify the features, such as the invocations of libraries, statements or references to services in the code portions (or from the files, libraries, or other related data used or referenced by the code portions). These features may then be used to define one (or more) hierarchies for indexing the code change graphs. For example, a hierarchy for a cloud provider, such as provider network 200, may be one hierarchy, another hierarchy may be a programming language. The code change graphs may then be sorted or otherwise grouped according to their corresponding feature values into a location in the hierarchy (e.g., as illustrated in FIG. 1 all change graphs in domain 131*a*, services 133*a*, data type 135*a*, and API 137*a* may be grouped together as change graphs 139*a*).

Because change graphs may include features that are in different hierarchies, a change graph can be separately indexed in a different hierarchy. In this way, the scope a coding practice determined from a hierarchy can be indicated by the hierarchy in which the coding practice is determined (e.g., a cloud provider coding practice, a programming language practice).

Coding practice discovery 218 may also implement similarity indexing 430. Like similarity indexing 140 and the techniques discussed below with regard to FIGS. 6-9, may be performed. For example, preparation techniques, such as slicing as discussed below with regard to FIGS. 7-8, weighting nodes in a change graph, and then performing similarity comparisons, as discussed below with regard to FIG. 9, may be performed. As a result, similarity indexing 430 may provide hierarchies that include clustered and index change graphs 405. These clustered and index change graphs 405 may also be stored and used to answer requests (as discussed above with regard to FIG. 3) for particular features of indexed code changes at indexed change graph store 460.

Coding practice generation 219 may use clustered and indexed change graphs 405 to generating coding practices to be manually applied or detected by coding practice detection 214. Coding practice generation 219 may, in some embodiments, determine a fitness score to determine whether or not an indexed group of clustered and indexed change graphs 405, as discussed below. Coding practice generation 219 may also filter out indexed changes that do not meet a minimum number (e.g., a threshold of at least 5 code change graphs may have to be indexed together according to similarity value), or handle differently indexed amounts of change graphs (e.g., 5 or less is not used for coding practice generation more than 5 but less than 10 is for interactive practice generation 444, and more than 10 may be considered for automatic practice generation 442.

Automatic practice generation 442 may automatically generate a rule, description, or other structure used to detect a coding practice, in some embodiments. For example, if coding practice detection 214 utilizes a machine learning model to search for coding practices in a development project or other set of code, one of the after change portions of code may be used to generate a feature vector for similarity analysis used to search for coding practices in the development project. Different automatic generation criteria, including various minimum thresholds for fitness or quality scores (as discussed above), numbers of change graphs indexed together, or various other features of the indexed change graphs may be evaluated to determine whether (or not) automatic practice generation should be performed. For change graphs indexed that satisfy the criteria (or a least one criteria in some embodiments), automatic practice generation 442 may generate the coding practice. If automatic practice generation criteria is not satisfied, then interactive practice generation 444 may be used (or in some scenarios no coding practice generation may be performed, such as scenarios where only a single change graph is indexed together).

Interactive practice generation 444 may be used to prompt manual confirmation (or denial of) a coding practice, as indicated at 445 (and discussed above with regard to FIG. 3 and below with regard to FIG. 5). A practice prompt response 447 may then be used to add further material to a confirmed coding practice, in some embodiments. Coding practices 407 (generated automatically and/or interactively) may be provided to coding practice detection 214, in some embodiments.

FIG. 5 is a logical block diagram illustrating an interactive practice generation interface, according to some embodiments. Interactive practice generation interface 500 may be a graphical user interface implemented as part of code development service 210 (e.g., as part of coding practice management interface 301 discussed above with regard to FIG. 3). Coding practice prompt 510 may be used to provide potential coding practices to a user. Which coding practices are provided may, as discussed above and below, have to meet various criteria, such as having a minimum number of change graphs be indexed together according to a similarity analysis (e.g., as performed below with regard to FIGS. 7-9).

Coding practice prompt 510 may provide a display of before change code 520 and after change code 530. In this way, a user can visually review the changes that were committed to the code portion in order to provide feedback confirming or denying the change as a practice. For example, practice configuration an description element 540 may include various text input boxes, check boxes, drop-down menus, or various other options for labeling or describing whether the displayed change should be a coding practice, as indicated at 542. In some embodiments, follow-up or further information may be requested if the example is identified as a coding practice to follow. For example, a prompt that asks for a user to provide other information for detection and correcting code using this practice may be provided, as indicated at 544, which may allow a user to provide information such as a practice description, correction instructions, and/or other information which may be used as part of code detection 214.

Figure 6:
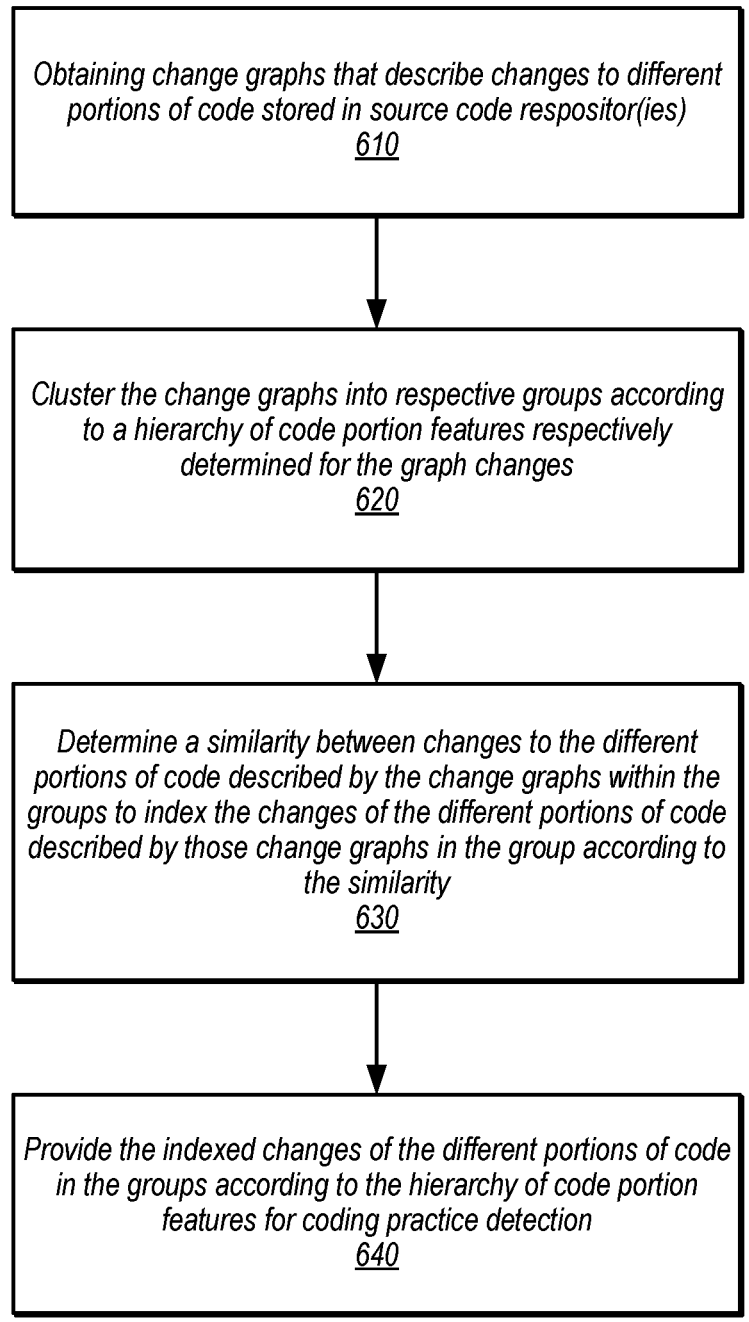
FIG. 6 is a high-level flowchart illustrating techniques and methods to implement hierarchical clustering for coding practice discovery, according to some embodiments.

The examples of hierarchical clustering for coding practice discovery discussed above with regard to FIGS. 2-5 have been given in regard to one example of a code development service. Various other types of code development tools, systems, or applications may implement these techniques. FIG. 6 is a high-level flowchart illustrating techniques and methods to implement hierarchical clustering for coding practice discovery, according to some embodiments. These techniques, as well as the techniques discussed below with regard to FIGS. 7-10, may be implemented using various components of a provider network as described above with regard to FIGS. 2-5 or other types or systems implementing code development tools or other applications.

As indicated at 610, change graphs that describe changes to different portions of code stored in source code repositor(ies), may be obtained, in some embodiments. For example, as discussed above with regard to FIGS. 3 and 4, change graphs may be provided (e.g., via an interface by uploading the change graphs or specifying a data store location where the change graphs are stored). As also discussed above, change graphs may be extracted from specified code repository(ies).

As indicated at 620, the change graphs may be clustered into respective groups according to a hierarchy of code portion features respectively determined for the change graphs. For example, different features may be various metadata descriptive of the code portions and determined for the code portion described by change graphs, including, but not limited to, a domain (e.g., language, cloud provider, etc.), a service (e.g., database service, storage service, compute service, programming language, etc.), data type (e.g., data object type, integer, string, float, etc.) and function (e.g., programmatic interface (API), method, etc.). Different domains may have different arrangements of features (e.g., a cloud provider domain may have different sub features than a language domain). Portions of changed code may belong to more than one group in the hierarchy of code portion features (e.g., a code portion that includes multiple API calls may be included in the group corresponding to each of the API calls.

In some embodiments, an anchor node may be used to determine the hierarchy a code portion belongs to. An anchor node may be an action node that is present in both the "before" code and "after" code in a change graph. However, code changes that contain a new action node in the after code for which there is no corresponding action node in before code, or where an existing action node is deleted from the before code and there is no corresponding action node in after code, the anchor node may be determined by the library calls in the change. A library call may a call to a specific functionality in a third-party library from the code portion.

As discussed above, the features of the code portions described by the change graph may be placed in a hierarchy to cluster the change graphs into groups and an anchor node may be used to identify which hierarchy to place the change graph. An example hierarchy is illustrated and discussed above with regard to FIG. 1. Another example of a hierarchy may follow the following pattern:

1) At the top-level, code changes may be indexed based on a code library, for example, if an anchor node in a code change contains API calls pertaining to a cloud provider A, those code changes will be indexed into "cloud provider A" hierarchy. Similarly, if the anchor node in a code change contains API calls pertaining to a programming language or other open-source libraries, those code changes will be indexed into their respective top-level indexes.

2) At the next level, code changes may be indexed based on the package in that library to which the anchor node belongs to. For example, if the anchor node in a code change belongs to programming language A's utility package, that code change may be indexed into "programming language A→utility package" hierarchy. Similarly, if the anchor node in a code change graph belongs to the database service B from cloud provider C, then that code change is indexed into "cloud provider C→database service B" hierarchy.

3) At the third-level, code changes may be indexed based on the data types of the anchor node. For example, if the anchor node in a code change has type "Set" container from the programming language A utility package, that code change may be indexed into "programming language A→utility package→Set" hierarchy. Similarly, if the anchor node in a code change has type PutObjectRequest from cloud provider C, then that code change is indexed into "cloud provider C→database service B→PutObjectRequest" hierarchy.

4) At the fourth-level, code changes may be indexed based on the API calls in the anchor node. For example, code changes that calls "isEmpty" API on a Set object are indexed into "programming language A→utility package→Set→isEmpty" hierarchy. Similarly, code changes that calls the "withBucketName" API on a PutObjectRequest object to set the data storage location name to which the PUT action was initiated, are indexed into "cloud provider C→database service B→PutObjectRequest→locationName" hierarchy.

As indicated at 630, a determination of similarity may be made between changes to the different portions of the code described by the change graphs within the groups to index the changes to the different portions of code described by those change graphs in the group according to the similarity, in some embodiments. For example, at the lowest level of the hierarchy (sometimes referred to the leaf-level of the hierarchy), the change graphs may then be indexed based on the similarity of the change (e.g., based on the semantic similarity of the change). For example, if using semantic similarity, the distinct semantic properties of a change may be determined by featurizing the code change with predetermined set of feature predicates that helps to capture features such as the addition of try-catch block, conditional statements, method-calls or log statements, addition of downstream checks, and others.

Various different similarity analysis may be performed. For example, similarity may be determined using techniques based on locality sensitive hashing. In another example, similarity techniques may be performed that utilize token-based comparisons, where, for instance, some words, symbols, or instructions in the code may be replaced with tokens. In another example embodiment, as discussed in detail below with regard to FIGS. 9 and 10, a Jaccard distance based similarity function may be used to determine the similarity of the code change at the lowest-level. As discussed in detail below with regard to FIGS. 7 and 8, graph slicing may be performed to prune away nodes and edges in the change graph that are not reachable from the anchor node. The slicing may help to remove the irrelevant subgraphs in the code change and featurize the core component of the change pertaining to the anchor node, which in turn may lead to more precise matching between a pair of code changes, and higher homogeneity of the indexed code changes.

As indicated at 640, the indexed changes to the different portions of code in the groups according to the hierarchy of code portion features may be provided for coding practice detection, in some embodiments. For example, as discussed above with regard to FIGS. 3-5, different types of requests to obtain code graphs clustered according to a particular location of the hierarchy (e.g., at domain, service, and/or API level) as may be indicated by one or more features and requests to respond to or ask for possible coding practices to confirm and describe (or to deny). In some embodiments, the indexed changes may be provided to system that performs code practice generation automatically (e.g., using a fitness or quality score of code changes described in similar code change graphs).

In some embodiments, the fitness score of a coding practice that may be identified according to similar code change graphs may be determined, for example, using the number of code changes and number of developers (and/or packages) contributing to these code changes. The greater the fitness score, the higher the quality of coding practice generated from these indexed code changes. In some cases, along with the fitness score, indexed code changes may be cross-referenced with coding documentation/reference guides to find authoritative guidelines that conforms with the coding practice in any particular hierarchy (e.g., domain). In the absence of authoritative documentation sources, the fitness score may be used as evidence to determine the quality of the coding practice.

Figure 7:
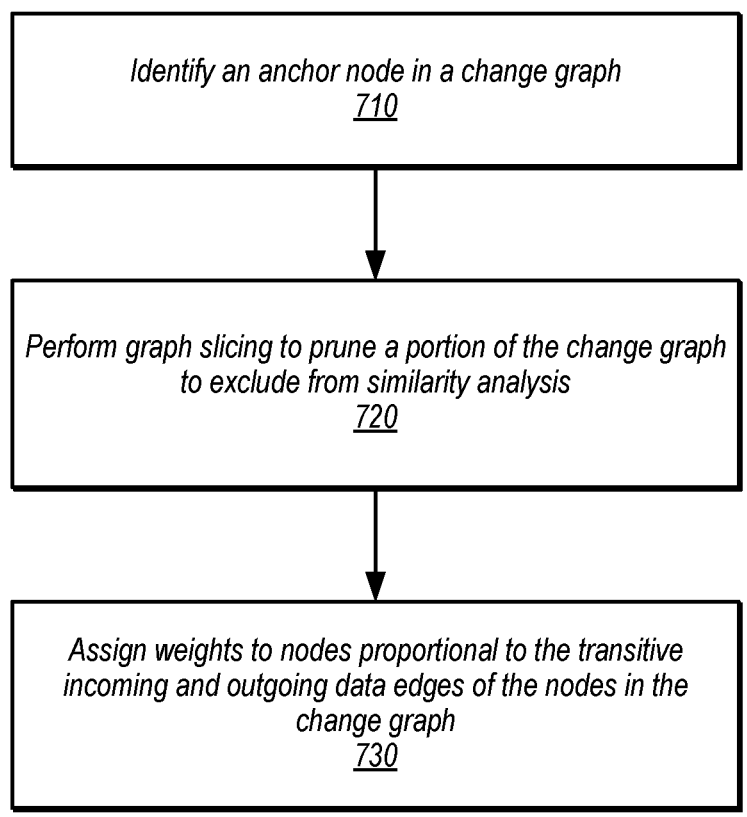
FIG. 7 is a high-level flowchart illustrating techniques and methods to implement preparing a change graph for similarity analysis, according to some embodiments.
Figure 8:
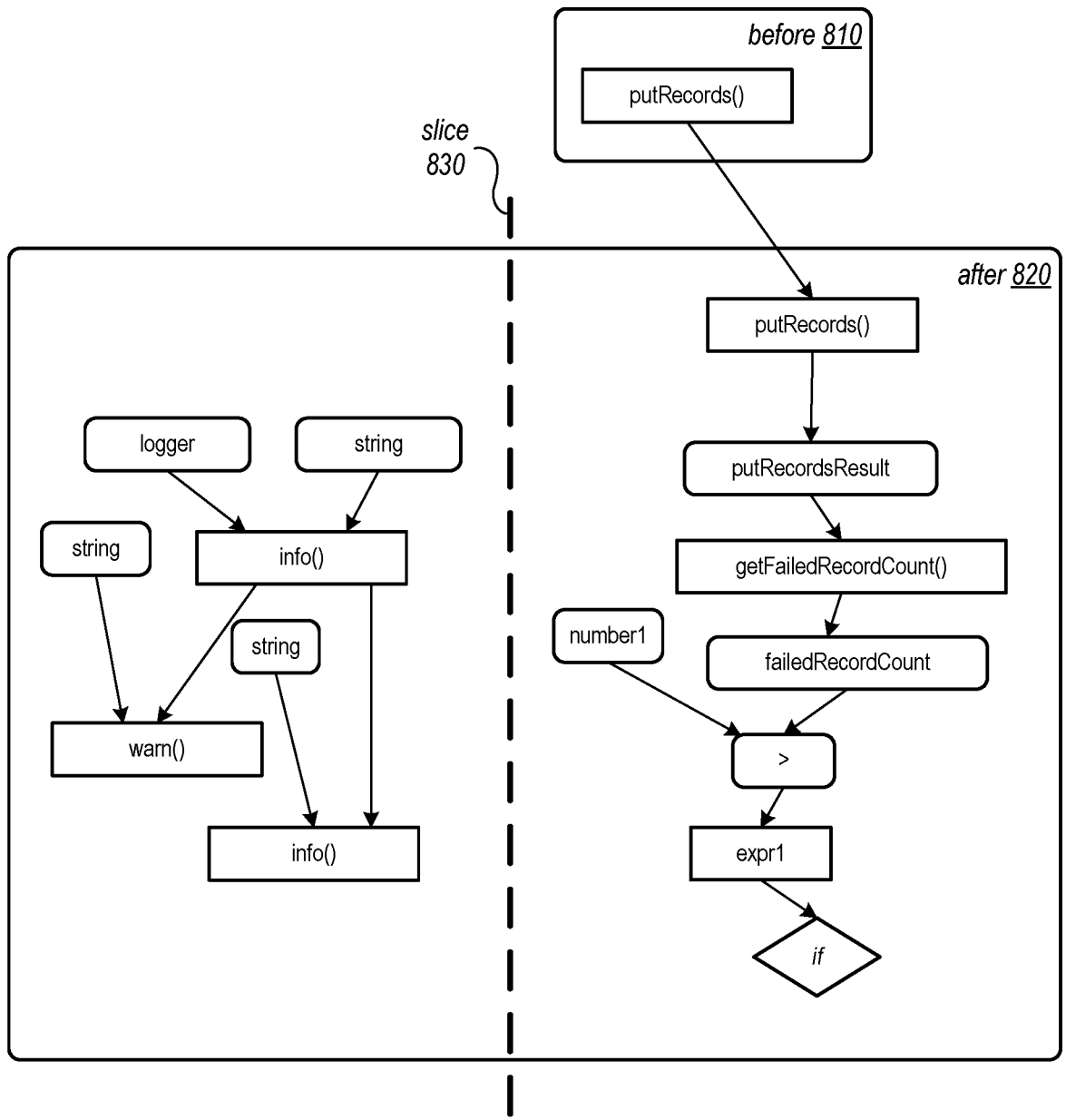
FIG. 8 is a logical block diagram illustrating a change graph slice, according to some embodiments.

FIG. 7 is a high-level flowchart illustrating techniques and methods to implement preparing a change graph for similarity analysis, according to some embodiments. As indicated at 710, an anchor node may be identified in a change graph, in some embodiments. As discussed before, an anchor node may be an action node that is present in both the "before" code and "after" code in a change graph. However, code changes that contain a new action node in the after code for which there is no corresponding action node in before code, or where an existing action node is deleted from the before code and there is no corresponding action node in after code, the anchor node may be determined by the library calls in the change. FIG. 8 provides an example of change graph, include before code 810 and after code 820. The anchor node may be "putRecords( )" as it is present in both before code 810 and after code 820.

As indicated at 720, graph slicing may be performed to prune a portion of the change graph to exclude from similarity analysis, in some embodiments. Different types of graph slicing may be performed depending the location of the anchor node in the change graph. Consider, for example, the change graph illustrated in FIG. 8. The anchor node "putRecords( )" at the top of the graph. Forward slicing may be performed to remove nodes or operations downstream or occurring after the anchor node that are unrelated (e.g., not connected to) anchor node. For example, slice 830 may be a forward slice that excludes the portion of code that issues a warning (e.g., based on the logger, strings, and other features on the left-hand side of after code 820 indicated by slice 830).

As indicated at 730, weights may be assigned to nodes proportional to the nodes transitive incoming and outgoing data edges in the change graph, in some embodiments. For example, the total number of arrows entering and leaving a node may be used to provide the weights. A weight for "putRecordsResult" in after code 820 may have a weight of 2 (e.g., one arrow in +one arrow out). These weights may be stored as a field, feature, attribute for each node in the change graph structure, in some embodiments.

Figure 9:
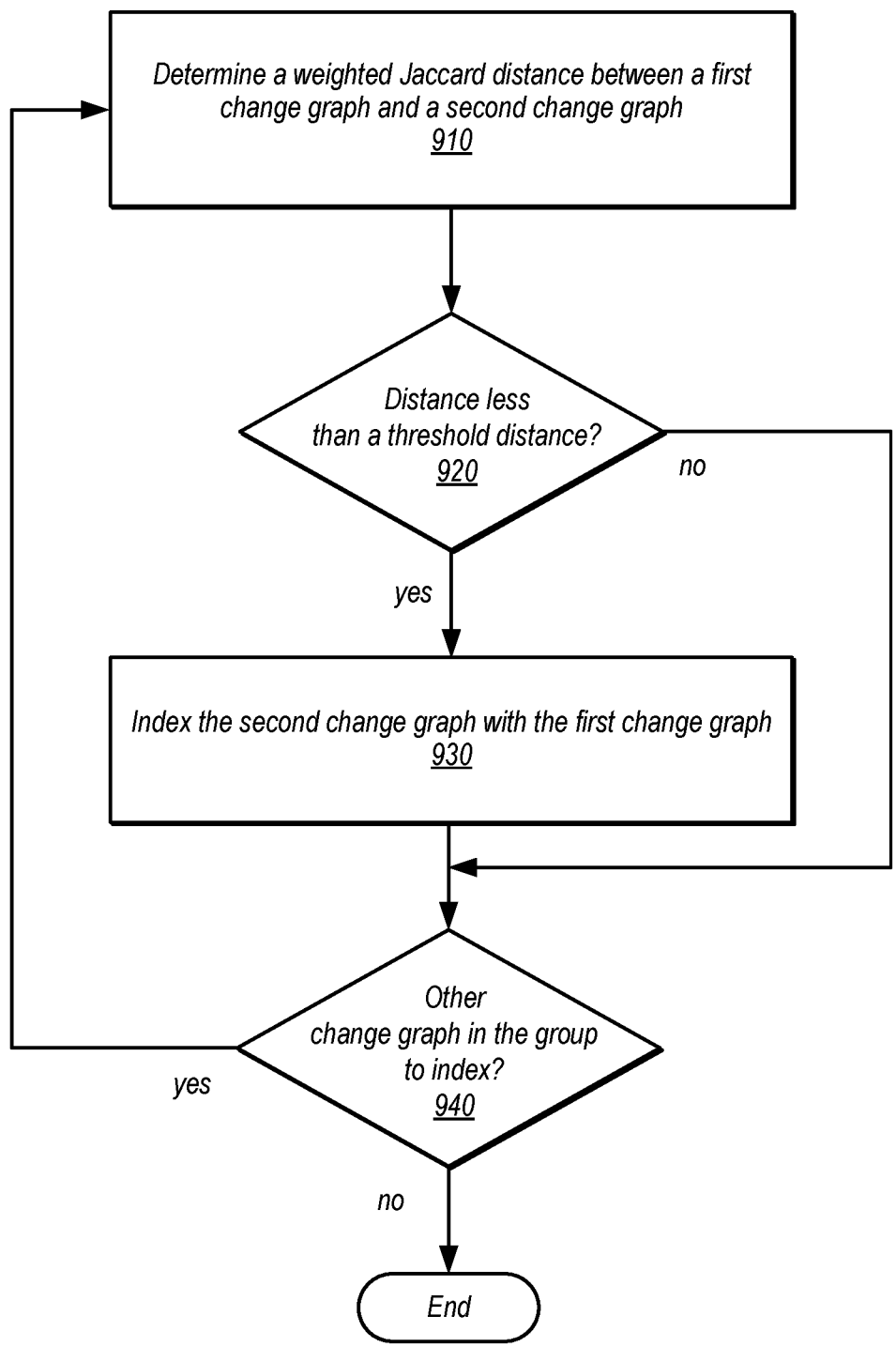
FIG. 9 is a high-level flowchart illustrating techniques and methods to implement similarity analysis, according to some embodiments.

The assigned weights of nodes in change graphs may be used to compare one change graph with another change graph that are in a same group in the hierarchy. This technique may be used to index (e.g. assign to a common cluster, group or other identifier) that can be used to lookup the included change graphs that are indexed together. FIG. 9 is a high-level flowchart illustrating techniques and methods to implement similarity analysis, according to some embodiments.

As indicated at 910, a weighted Jaccard distance may be determined between a first change graph and a second change graph, in some embodiments. The Jaccard index, also known as the Jaccard similarity coefficient, is a statistic used for comparing the similarity and diversity of sample sets. The Jaccard coefficient measures similarity between finite sample sets, and is defined as the size of the intersection divided by the size of the union of the sample sets:

$$JaccardIndex = \frac{|A \cap B|}{|A \cup B|} = \frac{|A \cap B|}{|A| + |B| - |A \cap B|}$$

$$JaccardDistance = 1 - JaccardIndex$$

Based on the Jaccard distance, a weighted Jaccard distance may then be determined as:

$$J(x, y) = \frac{\sum_i \min(x_i, y_i)}{\sum_i \max(x_i, y_i)}$$

where x is a feature vector of the first change graph using the assigned weights and y is a feature vector of the second change graph using the assigned weights.

As indicated at 920, a distance threshold may be applied to determine whether the second change graph is, or is not, indexed with the first change graph. For example, a distance threshold of 0.5 would cause a weighted Jaccard distance of less than 0.5 to be similar enough to index together. As indicated at 930, if the distance is less than the distance threshold, then the second change graph may be included with the first change graph. For example, an array, list, or other index for the first change graph may be updated to include a pointer to or other indicator of the second change graph. This technique may be repeated to consider all of the different possible combinations (e.g., pairs) of change graphs within a group in the hierarchy. For example, if another change graph may be evaluated with respect to the first change graph, then the technique may be repeated. Then, another change graph (e.g., the second change graph may be chosen), and the technique repeated to determine similarity between the second change graph and other change graphs may be performed again. In this way, a final index for change graphs in a location in the hierarchy may be completed.

Note that some change graphs may have no other change graphs included. In some embodiments, a threshold number of change graphs may have to be indexed together in order to provide the change graphs for coding practice detection (e.g., 5 or more change graphs).

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement a provider network described herein). The various methods as illustrated in the figures and described herein represent example embodiments of methods. The order of any method may be changed, and various elements may be added, reordered, combined, omitted, modified, etc.

Figure 10:
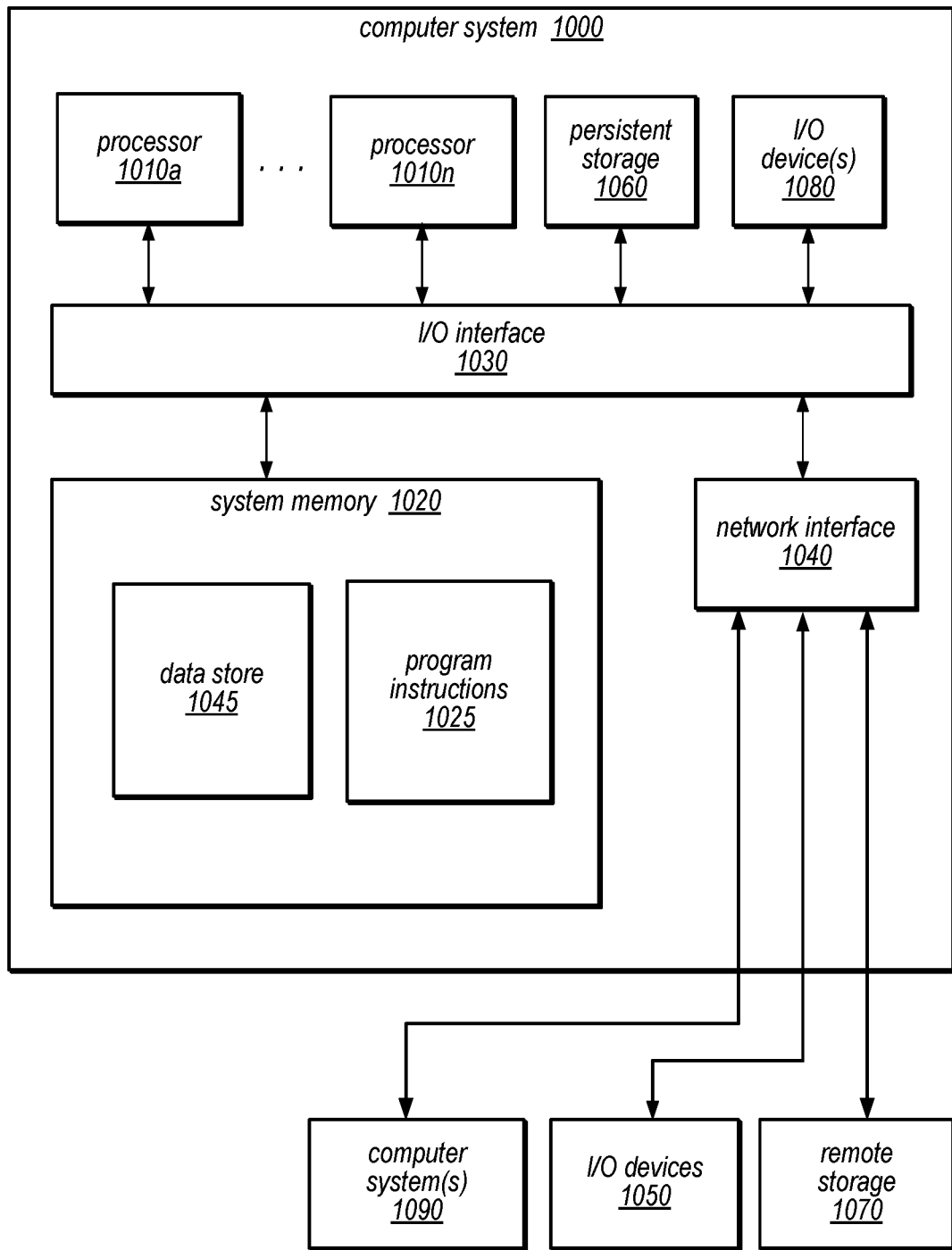
FIG. 10 is a block diagram illustrating an example computing system, according to some embodiments.

Hierarchical clustering for coding practice discovery as described herein may be executed on one or more computer systems, which may interact with various other devices. FIG. 10 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the provider network described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to:
   obtain a plurality of change graphs that describe respective changes to different portions of code stored in a source code repository;
   generate a hierarchy of code portion features respectively determined for the plurality of change graphs that groups at a lowest level of the hierarchy the plurality of change graphs into respective groups;
   for individual ones of the respective groups, determine a similarity between the respective changes to the different portions of code described by those change graphs within the group to index the respective changes to the different portions of code described by those change graphs in the group according to the similarity;
   generate at least one coding practice from the indexed respective changes to the different portions of code in the respective groups according to the hierarchy; and
   provide the generated at least one coding practice to at least one feature of a code development system that applies the at least one coding practice as part of coding practice detection, wherein the coding practice detection includes analyzing code being developed, detecting one or more issues in the code being developed, and correcting the one or more issues by applying the at least one coding practice.

2. The system of claim 1, wherein to determine the similarity between the respective changes to the different portions of code described by those change graphs within the group to index the respective changes to the different portions of code described by those change graphs in the group according to the similarity, the program instructions cause the at least one processor to:

assign respective weights to nodes in the change graphs proportional to incoming and outgoing data edges to individual ones of the nodes in the change graphs; and determine weighted Jaccard distances between different pairs of change graphs in the group to compare with the weighted Jaccard distances with a threshold distance, wherein those pairs of change graphs with weighted Jaccard distances less than the threshold distance are indexed together and those pairs of change graphs with weighted Jaccard distances more than the threshold distance are not indexed together.

3. The system of claim 1, wherein to obtain the plurality of change graphs that describe respective changes to different portions of code stored in the source code repository, the program instructions cause the at least one processor to access the source code repository to determine differences between the different portions of code before and after commits of the changes to the different portions of code are made to the source code repository to generate the plurality of change graphs.

4. The system of claim 1, wherein the at least one processor and the memory are implemented as part of a code development service offered by a provider network and wherein the at least one coding practice is used by a coding practice detection feature of the code development service on one or more other source code repositories hosted by the code development service.

5. A method, comprising:

obtaining, by a coding practice discovery system, a plurality of change graphs that describe respective changes to different portions of code stored in a source code repository;

clustering, by the coding practice discovery system, the plurality of change graphs into respective groups according to a hierarchy of code portion features respectively determined for the plurality of change graphs;

for individual ones of the respective groups, determining, by the coding practice discovery system, a similarity between the respective changes to the different portions of code described by those change graphs within the group to index the respective changes to the different portions of code described by those change graphs in the group according to the similarity; and providing, by the coding rule practice system, one or more of the indexed respective changes to the different portions of code in the respective groups according to the hierarchy as one or more coding practices to at least one feature of a code development system that applies the one or more coding practices as part of coding practice detection, wherein the coding practice detection includes analyzing code being developed, detecting one or more issues in the code being developed, and correcting the one or more issues by applying the at least one coding practice.

6. The method of claim 5, wherein determining the similarity between the respective changes to the different portions of code described by those change graphs within the group to index the respective changes to the different portions of code described by those change graphs in the group according to the similarity comprises:

assigning respective weights to nodes in the change graphs proportional to incoming and outgoing data edges to individual ones of the nodes in the change graphs; and determining weighted Jaccard distances between different pairs of change graphs in the group to compare with the weighted Jaccard distances with a threshold distance, wherein those pairs of change graphs with weighted Jaccard distances less than the threshold distance are indexed together and those pairs of change graphs with weighted Jaccard distances more than the threshold distance are not indexed together.

7. The method of claim 5, wherein the hierarchy of code portion features corresponds to a cloud provider that implements one or more services.

8. The method of claim 5, wherein the plurality of change graphs that describe respective changes to different portions of code stored in a source code repository are received as part of a request to perform coding practice discovery by the coding practice discovery system.

9. The method of claim 5, wherein obtaining the plurality of change graphs that describe respective changes to the different portions of code stored in the source code repository comprises determining differences between the different portions of code before and after commits of the changes to the different portions of code are made to the source code repository to generate the plurality of change graphs.

10. The method of claim 5, wherein determining the similarity between the respective changes to the different portions of code described by those change graphs within the group to index the respective changes to the different portions of code described by those change graphs in the group according to the similarity comprises:

identifying an anchor node in one of the change graphs; and performing forward graph slicing from the anchor node in the one change graph to exclude a portion of the one change graph from determining the similarity.

11. The method of claim 5, wherein providing the one or more of the indexed respective changes to the different portions of code in the respective groups according to the hierarchy as one or more coding practices comprises automatically generating the one or more coding practices from the one or more indexed respective changes after evaluating one or more automatic generation criteria with respect to the one or more indexed respective changes.

12. The method of claim 5, wherein source code repository from which the plurality of change graphs are obtained is specified in a request to the coding practice discovery system.

13. The method of claim 5, wherein providing the one or more of the indexed respective changes to the different portions of code in the respective groups according to the hierarchy as the one or more coding practices comprises sending a prompt to confirm that the indexed respective changes to the different portions of code describe the one or more coding practices.

14. One or more non-transitory, computer-readable storage media, storing program instructions that when executed on or across one or more computing devices cause the one or more computing devices to implement:

obtaining a plurality of change graphs that describe respective changes to different portions of code stored in a source code repository;

generating a hierarchy of code portion features respectively determined for the plurality of change graphs that groups at a lowest level of the hierarchy the plurality of change graphs into respective groups;

for individual ones of the respective groups, determining a similarity between the respective changes to the different portions of code described by those change graphs within the group to index the respective changes to the different portions of code described by those change graphs in the group according to the similarity; and providing one or more of the indexed respective changes to the different portions of code in the respective groups according to the hierarchy as one or more coding practices to at least one feature of a code development system that applies the one or more coding practices as part of coding practice detection, wherein the coding practice detection includes analyzing code being developed, detecting one or more issues in the code being developed, and correcting the one or more issues by applying the at least one coding practice.

15. The one or more non-transitory, computer-readable storage media of claim 14, wherein, in determining the similarity between the respective changes to the different portions of code described by those change graphs within the group to index the respective changes to the different portions of code described by those change graphs in the group according to the similarity, the programming instructions cause the one or more computing devices to implement:

assigning respective weights to nodes in the change graphs proportional to incoming and outgoing data edges to individual ones of the nodes in the change graphs; and determining weighted Jaccard distances between different pairs of change graphs in the group to compare with the weighted Jaccard distances with a threshold distance, wherein those pairs of change graphs with weighted Jaccard distances less than the threshold distance are indexed together and those pairs of change graphs with weighted Jaccard distances more than the threshold distance are not indexed together.

16. The one or more non-transitory, computer-readable storage media of claim 14, wherein the hierarchy of code portion features corresponds to a programming language.

17. The one or more non-transitory, computer-readable storage media of claim 14, wherein, in obtaining the plurality of change graphs that describe respective changes to the different portions of code stored in the source code repository, the programming instructions cause the one or more computing devices to implement determining differences between the different portions of code before and after commits of the changes to the different portions of code are made to the source code repository to generate the plurality of change graphs.

18. The one or more non-transitory, computer-readable storage media of claim 14, wherein, in determining the similarity between the respective changes to the different portions of code described by those change graphs within the group to index the respective changes to the different portions of code described by those change graphs in the group according to the similarity, the programming instructions cause the one or more computing devices to implement:

identifying an anchor node in one of the change graphs; and performing backward graph slicing from the anchor node in the one change graph to exclude a portion of the one change graph from determining the similarity.

19. The one or more non-transitory, computer-readable storage media of claim 14, wherein providing the one or more of the indexed respective changes to the different portions of code in the respective groups according to the hierarchy as the one or more coding practices sending a prompt to confirm that the indexed respective changes to the different portions of code describe the one or more coding practices.

20. The one or more non-transitory, computer-readable storage media of claim 14, wherein the at least one processor and the memory are implemented as part of a code development service offered by a provider network and wherein feature is a feature of the code development service used on one or more other source code repositories hosted by the code development service.

* * * * *